United States Patent [19]

Yoshida et al.

[11] 4,367,938

[45] Jan. 11, 1983

[54] ELECTROMAGNETICALLY DRIVEN SHUTTER

[75] Inventors: Syozo Yoshida, Machida; Syuichiro Saito, Yokohama, both of Japan

[73] Assignee: Canon Kabushiki Kaisha, Japan

[21] Appl. No.: 295,013

[22] Filed: Aug. 21, 1981

Related U.S. Application Data

[63] Continuation of Ser. No. 213,918, Dec. 8, 1980, abandoned.

[30] Foreign Application Priority Data

Dec. 7, 1979 [JP] Japan ................. 54-169606

[51] Int. Cl.³ .............................................. G03B 9/62
[52] U.S. Cl. .................................................. 354/234
[58] Field of Search ................. 354/50, 51, 60 R, 234, 354/235

[56] References Cited

U.S. PATENT DOCUMENTS 3,747,495  7/1973  Tenkumo et al. ................... 354/234

Primary Examiner—Michael L. Gellner
Attorney, Agent, or Firm—Toren, McGeady and Stanger

[57] ABSTRACT

An electromagnetically driven shutter for use in a photographic camera has blades driven by an electromagnetic drive source to move in vertical directions. The electrical power supply control means for the electromagnetic drive source is provided with means for detecting the photographic posture of the camera, whereby the output torque of the electromagnetic drive source is changed as the camera posture changes. This is done in order to insure that the speed of movement of the shutter blades is maintained constant regardless of whether or not the camera is positioned normally, or upside down.

8 Claims, 4 Drawing Figures

ELECTROMAGNETICALLY DRIVEN SHUTTER

This is a continuation of application Ser. No. 213,918, filed Dec. 8, 1980, now abandoned.

BACKGROUND OF THE INVENTION

This invention relates to cameras having shutters with electromagnetic drive sources for driving the shutter to open and close, and, more particularly, to an electromagnetically driven shutter having a mechanism for correcting the variation of shutter time due to the camera posture difference when shooting.

The electromagnetically driven shutter-equipped camera, of which the opening and closing operation of the shutter blades is performed by the electromagnetic drive source, not only can be made simpler in mechanical structure, lighter in weight and smaller in bulk and size than the mechanically driven shutter-equipped one which has prevailed in the past, but is also more advantageous in production and even can result in the reduction of production cost. Recently, therefore, many proposals have been made for such a camera.

However, the electrical power source within the camera suffers from the limitation of the electrical energy capacitance and container volume so that it is often required to limit the drive torque of this kind electromagnetic drive source to the necessary minimum.

On the other hand, with the drive torque of the electromagnetic drive source suppressed to such a low value, when the load on the electromagnetic drive source is changed, its influence will become quite serious.

And, this will lead unintentionally to differentiate the speed of movement of the shutter thereby making it impossible to assure the required accuracy of exposure control.

As an example of such situation, upon consideration of a case where, for example, the posture of the camera is changed, since the electromagnetically driven shutter mechanism is designed to have a certain load on the drive source therefor on the assumption that the camera is posed normally, when the camera is used in a different posture from the normal one, the load of the shutter mechanism on the drive source is caused to change with the required value of torque being in excess of the design value.

Now assuming that the shutter mechanism is so designed that with the camera in the normal horizontal position, the shutter blades move, for example, downwardly when the shutter is opened, then with the camera turned upside down, the opening of the shutter is effected by the upward movement of the blades with the resulting load being automatically changed. Further, since the torque of the electromagnetic drive source is suppressed to as small a value as possible, this influence works out just as it is. Thus, the shooting of the camera in the upside down position leads to a large loss in the shutter speed.

SUMMARY OF THE INVENTION

With such drawbacks of the prior art in mind, one of the objects of the present invention is to provide an electromagnetically driven shutter device capable of assuring a predetermined speed of running movement of the shutter regardless of a change of the posture of the camera.

Another object of the invention is to provide an electromagnetically driven shutter of which the drive torque changes depending upon the posture of the camera.

According to an embodiment of the present invention, use is made of posture detecting means for detecting the posture of the camera, and the amount of current supplied to the electromagnetic drive member is controlled by the output of this posture detecting means so that the driving torque in the electromagnetic drive member can be readily changed.

According to a practical embodiment of the present invention, the posture detecting means takes the form of a switch member having a number of operative positions for the various postures of the camera. As this switch member changes its position, the intensity of current is changed, thus simplifying the posture detection.

According to another practical embodiment of the present invention, a plurality of such switch members as described above are used and arranged to be selectively operated depending upon the different posture of the camera so that it is possible to obtain an almost constant speed of movement of the shutter for the various postures of the camera.

DESCRIPTION OF THE PREFERRED EMBODIMENTS

The present invention will next be described in greater detail by reference to the drawings.

Figure 1:
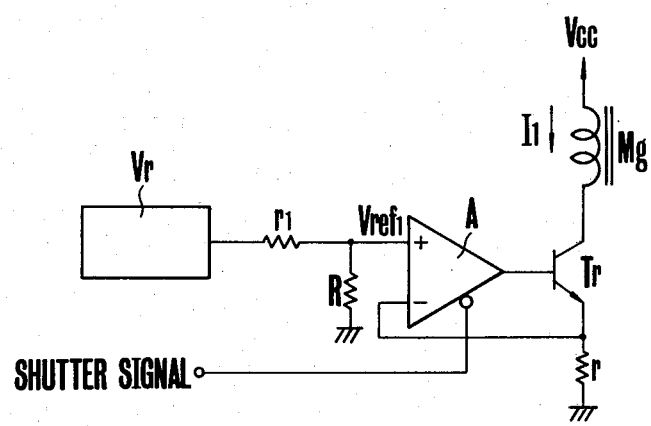
FIG. 1 is an electrical circuit diagram showing the principle of the drive circuit of an electromagnetically driven shutter of the present invention.

FIG. 1 is a schematic electrical circuit diagram showing the principle of the drive circuit for the constant current drive type electromagnetically driven shutter.

In the figure, Vr is a constant voltage source; $r_1$, R are voltage dividing resistors connected to this constant voltage source; and A is an operational amplifier. Tr is an output transistor with its base connected to the above-described operational amplifier A at the output terminal thereof. Again, the operational amplifier A has a non-inverting input terminal which is connected to a point of connection between the resistors R and $r_1$. r is an emitter resistor of the transistor Tr; Mg is a solenoid within an electromagnetic drive member to be described later. The collector of the above-described transistor Tr is connected through this solenoid Mg to an electrical power source Vcc.

Again, the operational amplifier A has an inverting input which is connected to the emitter of the transistor Tr.

Again, the operational amplifier A is arranged upon advent of a shutter release signal to produce an output signal.

In the circuit of such construction, upon advent of the shutter release signal, the current flowing from the constant voltage source is voltage-divided by the resistors $r_1$ and R, causing the operational amplifier A to turn on the transistor Tr. Thus, the solenoid Mg is supplied with current of a predetermined level. This current value does not vary to large extent since the influence by the temperature variation is almost negligible. Therefore, the driving torque exerted in the electromagnetic drive member is almost constant.

Letting T denote this torque, and I the current flowing through the solenoid Mg, we have the following relationship:

$$T = kI$$

where k is the constant.

Again, the current $I_1$ flowing through the solenoid Mg may be expressed by the following formula provided that the base current of the transistor Tr is neglected:

$$I_1 = Vref/r$$

where Vref is the non-inverting input voltage of the operational amplifier A. If the $I_1$ is constant independently of a change of the shooting posture of the camera, the driving torque T is constant and the shutter runs down at the same speed.

When the gravity of the shutter blades or like load on the drive source is changed such as results from the change of the shooting posture of the camera, the shutter speed is caused to change, since the solenoid is energized with the supply of the constant current. For example, the shutter is so constructed that, when in the normal posture, the shutter blades move downward, while when in the upside down position, they move upward. Then, because of the influence of the gravity, the shooting of the camera in the upside down posture leads to lower the shutter speed, as the driving torque of the electromagnetic drive source is weak.

Figure 2:
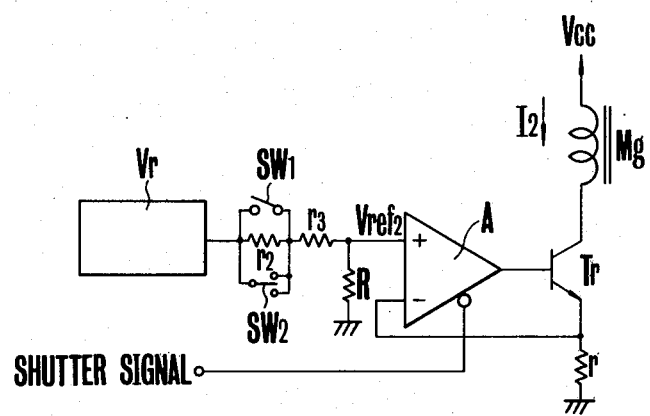
FIG. 2 is an electrical circuit diagram of one embodiment of a drive circuit of the electromagnetically driven shutter according to the present invention.

FIG. 2 is an electrical circuit diagram of one embodiment of a drive circuit for the electrically driven shutter according to the present invention, where the resistor $r_1$ in the circuit of FIG. 1 is replaced by a series circuit of resistors r2 and r3, and the both ends of the r2 are connected to an ON-OFF switch SW1 and a changeover switch SW2 which are connected in parallel to each other, and where the other parts are similar to those shown in FIG. 1 and denoted by the same reference character. The SW1 is in the OFF portion, when the camera is used in the normal horizontal posture, and is turned on when the camera is turned upside down. And, the SW2 is a normally open switch which is closed when the camera is tilted sideward.

Figure 3:
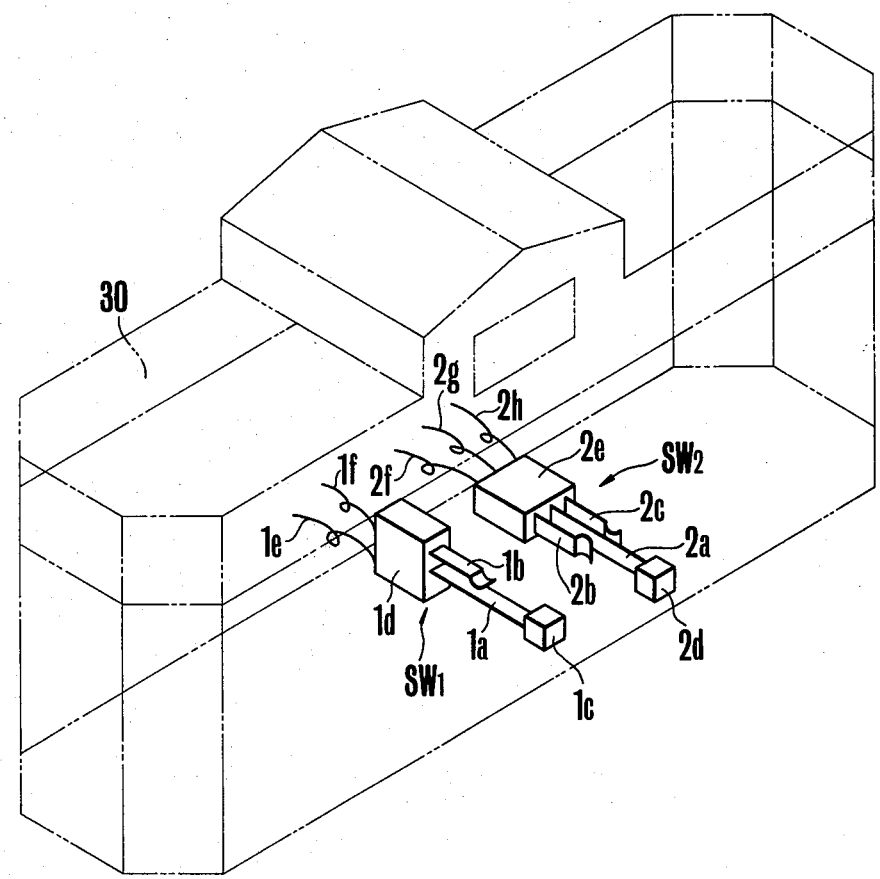
FIG. 3 is a perspective view of an example of an arrangement of the camera posture detecting switches of FIG. 2 within the camera housing.

FIG. 3 shows an arrangement of the posture detecting switches SW1 and SW2 within the camera housing. In this arrangement, the switch SW1 is closed when the camera is used in the opposite position with reference to the vertical direction, and the switch SW2 is closed when the camera is tilted to either the right or left. 1a and 1b are contacts of the switch SW1, and a bullet 1c is mounted on the free end of the contact 1a. 1d is a terminal portion of the switch SW1, and 1e and 1f are lead wires. The switch SW2 has contacts 2a, 2b and 2c, and the free end of the central contact 2a carries a bullet 2d. 2f, 2g and 2h are lead wires. These switches SW1 and SW2 are fixed at suitable locations within the interior of the camera. It is also noted that these posture detecting switches are not limited to only two but may be increased in number. If so, it is possible to perform a more delicate posture discrimination.

Next, explanation is given to the operation of the shutter speed correcting mechanism of FIGS. 2 and 3. FIG. 3 shows the camera 30 assuming the normal position (in this instance, horizontal shooting position). In the figure, the gravity acts downward as viewed in the figure and the bullet 1c of the switch is subjected to the downward force so that the contact 1a is moved away from the contact 1b. Also the bullet 2d of the contact 2a of the switch SW2 in this posture is subjected to the downward force. But since the contact 2a is so constructed as not to bend downward, the contact 2a does not contact with either of the contacts 2b and 2c.

Then, when the camera is disposed with the left side down, as the bullet 2d is subjected to the force in the leftward direction, the contact 2a is bent until it contacts with the contact 2b. Conversely, when the camera is disposed with the right side down, the contact 2a is brought into contact with the contact 2c by the bullet 2d. In this case, though the gravity acts on the bullet 1c of the contact 1a of the switch SW1 also, the switch SW1 remains in the OFF state since the contact 1a is so constructed as not to bend sideward.

Therefore, with the switches SW1 and SW2 of FIG. 3 connected in the circuit of FIG. 2, when the camera takes the normal position with respect to the vertical direction, the both ends of the resistor r2 is open. Then, when the camera is either turned upside down, or tilted sideward, the resistor r2 is short-circuited by either one of the switches SW1 and SW2. That is, in FIG. 2, when the camera is in the normal posture, the switch SW1 is OFF and the SW2 is also OFF. Setting the resistors r2 and r3 with respect to the resistor r1 of FIG. 1, therefore, we have the non-inverting input Vref2 of the operational amplifier A equal to the Vref1 of FIG. 1, and the current I2 flowing to the solenoid Mg of the electromagnetic drive member is expressed as:

$$I2 = Vref2/r = Vref1/r$$

so that it is made equal to the magnetizing current I1 of the circuit of FIG. 1, and the torque produced thereby is also equalized.

Next, when the camera is in one of the other postures than the normal one, either of the switches SW1 and SW2 is turned on to short-circuit the resistor r2. In this case, the Vref2 becomes:

$$Vref2 = \frac{R}{r3 + R} \cdot Vr$$

so that the current I'2 flowing to the solenoid Mg at this time becomes $$I'2 = \frac{V'ref2}{r} = \frac{R}{r3 + R} \cdot \frac{Vr}{r}$$

where since $$Vref1 = \frac{R}{r1 + R} Vr = \frac{R}{r2 + r3 + R} Vr,$$

we have $$I2 = \frac{Vref1}{r} = \frac{R}{r1 + R} \cdot \frac{Vr}{r} = \frac{R}{r2 + r3 + R} \cdot \frac{Vr}{r}$$

That is, the ratio of the magnetizing current I'2 in the abnormal position to the magnetizing current I2 in the normal position becomes:

$$\frac{I2'}{I2} = \frac{r2 + r3 + R}{r3 + R} = 1 + \frac{r2}{r3 + R}$$

Since $r2/(r3+R) > 0$, the magnetizing current I2' in the abnormal posture is increased by $r2/(r3R)$ times the magnetizing current I2 in the normal posture. Therefore, the torque is also increased by the corresponding factor with increase in the shutter speed. Thus, the speed reduction due to the increase in the gravity on the shutter blades resulting from the abnormal posture of the camera is corrected for and the exposure can be adjusted with high accuracy.

Figure 4:
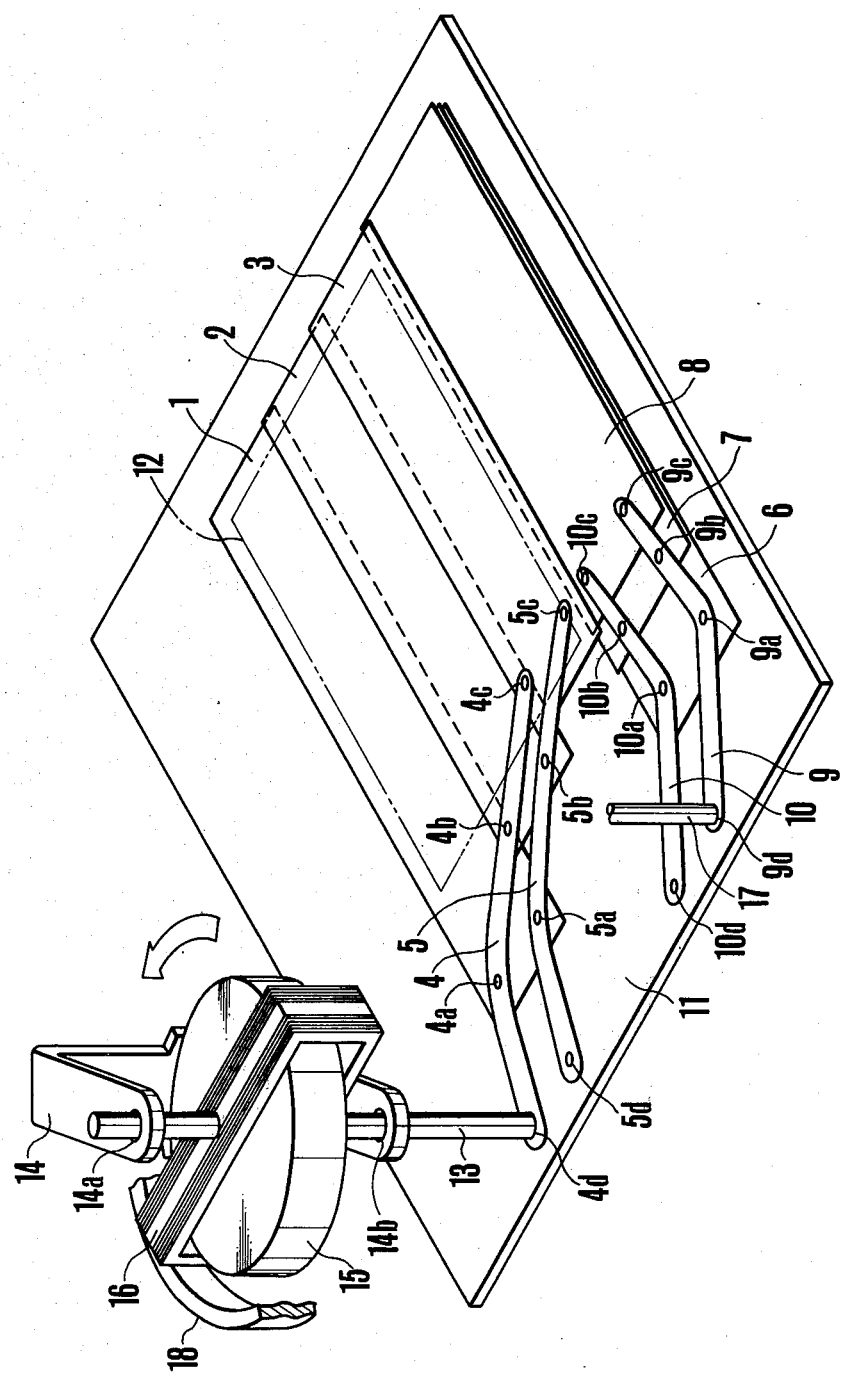
FIG. 4 is a perspective view of an example of construction of the electromagnetically driven shutter according to the present invention.

FIG. 4 shows an example of the electromagnetic drive source and shutter mechanism. In the figure, 11 is a shutter base plate having an exposure window 12. 4, 5 are leading blade drive arms. The arm 4 is fixedly secured at its one end to a leading blade drive shaft 13, and the 13 and 4 are pivotally mounted on the shutter base plate 11. Also the arm 5 is pivotally mounted at its one end on the shutter base plate 11. The arms 4 and 5 movably carry thin blades 1, 2 and 3 having light shielding property through pins 4a, 4b, 4c, 5a, 5b and 5c respectively.

9, 10 are trailing blade drive arms. The arm 9 is fixedly secured at its one end to a trailing blade drive shaft 17, and the arm 9 and the shaft 17 are pivotally mounted on the shutter base plate 11. Also the arm 10 is pivotally mounted at its one end on the shutter base plate 11. The arms 9 and 10 movably carry thin trailing blades 6, 7 and 8 having light shielding property through pins 9a, 9b, 9c, 10a, 10b and 10c respectively. 14 is a frame of an electromagnetic drive member, said frame being fixedly mounted on a camera housing (not shown). 15 is a permanent magnet magnetized in the diametrical direction, said magnet being fixed with reference to the frame. 16 is a shutter blade drive coil, said coil 16 being fixedly mounted on the drive shaft 13. The drive shaft 13 is movably supported in holes 14a and 14b of the frame 14, so that the coil 16 is rotatable with reference to a yoke 18 which is fixedly mounted in separation from the permanent magnet 15.

Because of such construction and arrangement, when the coil is supplied with current, the coil 16 interacts with the magnetic field of the permanent magnet 15 to turn in a direction indicated by arrow, while driving the leading blades to run down, this initiating an exposure.

It is noted that an electromagetic drive member for the trailing blades of the shutter may be the same as that for the leading blades, and, therefore, its illustration is omitted.

In the above embodiment, the shutter speed is assumed to be slower when in the abnormal posture than when in the normal one. The correction by the shooting posture detecting device of the present invention is applicable even to the converse case where the shutter speed is faster when in the abnormal posture than in the normal posture.

It is noted that instead of using the change-over switch and ON-OFF switch as the posture detecting means, a rotatable contact carrying a bullet which always takes the perpendicular direction and a sliding resistor always contacting with said contact may be used in combination to continuously control the intensity of current flowing to the solenoid Mg.

It is also noted that, even with the ON-OFF switch and change-over switch used as the posture detecting means, it is of course possible not only to merely shorten the both ends of the resistor but also to change the combination of resistor groups.

As will be seen from the foregoing, the present invention is directed toward the use of a correcting device for the posture difference with an advantage that the exposure correction effectively acts particularly in a camera employing the electromagnetic drive source of weak driving torque. This enables even the camera using the battery of small capacity and the drive source of small rating to assure a high accuracy of exposure control.

What is claimed is:

1. An electromagnetically driven shutter including:
 (a) at least one shutter blade member; a photographic light path is opened and closed by the displacement of said member;
 (b) an electromagnetic drive member; said member comprises a permanent magnet and a conductor member provided in the magnetic field of said permanent magnet;
 (c) a current supply control circuit; said circuit performs supply of a predetermined amount of current to the above-described conductor member in a predetermined direction, whereby an electromagnetic force of predetermined magnitude is exerted between the permanent magnet and the conductor member in the above-described electromagnetic drive member, causing the shutter blade member to move across the photographic light path at a predetermined speed; and
 (d) means for detecting the relation between the running direction and the gravity direction of the shutter blade member;

wherein the amount of current supplied to the above-described conductor member is controlled by the current supply control circuit in accordance with the signal produced from said posture detecting means, whereby, as the relationship between the direction of the movement of the shutter blade and the direction of the gravity changes, even when the load on the electromagnetic drive member is increased or decreased, the driving torque of said electromagnetic drive member is increased or decreased in a direction to compensate this so that the speed of movement of the above-described shutter blade is maintained to the predetermined speed.

2. An electromagnetically driven shutter according to claim 1, wherein said detecting means comprises a switch member arranged to be changed over when the relation between the direction of the movement of the shutter blade and the direction of the gravity changes.

3. An electromagnetically driven shutter according to claim 2, wherein said detecting means includes a plurality of switch members arranged to be selectively changed over depending upon the difference relationship between the respective direction of the movement of the shutter blade and the gravity.

4. An electromagnetically driven shutter according to claim 1, wherein said current supply control circuit has a plurality of resistors for changing over the amount of current supplied to the conductor member, and wherein these plural resistors are selectively combined depending upon the signal from the detecting means.

5. A camera having an electromagnetically driven shutter including:

(a) at least one shutter blade member; a photographic light path is opened and closed by the displacement of said member;

(b) an electromagnetic drive member; said member comprises a permanent magnet and a conductor member provided in the magnetic field of said permanent magnet;

(c) a current supply control circuit; said circuit performs supply of a predetermined amount of current to the above-described conductor member in a predetermined direction, whereby an electromagnetic force of predetermined magnitude is exerted between the permanent magnet and the conductor member in the above-described electromagnetic drive member, causing the shutter blade member to move across the photographic light path at a predetermined speed; and (d) posture detecting means; said means produces predetermined output signals depending upon the posture of the camera;

whereby the amount of current supplied to the above-described conductor member is controlled by the current supply control circuit in accordance with the signal produced from said posture detecting means, whereby, as the posture of the camera changes, even when the load on the electromagnetic drive member is increased or decreased, the driving torque of said electromagnetic drive member is increased or decreased in a direction to compensate this so that the speed of movement of the above-described shutter blade is maintained to the predetermined speed.

6. An electromagnetically driven shutter according to claim 5, wherein said posture detecting means is provided in the interior of the camera and comprises a switch member arranged to be changed over when the camera takes a predetermined posture.

7. An electromagnetically driven shutter according to claim 6, wherein said posture detecting means includes a plurality of switch members arranged to be selectively changed over depending upon the different posture of the camera.

8. An electromagnetically driven shutter according to claim 5, wherein said current supply control circuit has a plurality of resistors for changing over the amount of current supplied to the conductor member, and wherein these plural resistors are selectively combined depending upon the signal from the detecting means.

* * * * *